United States Patent
Zhang (10) Patent No.: US 12,407,617 B2
(45) Date of Patent: Sep. 2, 2025

(54) METHOD AND DEVICE FOR SETTING PRIORITY OF PACKET TRANSMISSION

(71) Applicant: MediaTek Singapore Pte. Ltd., Singapore (SG)

(72) Inventor: Zhuoliang Zhang, Anhui (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 68 days.

(21) Appl. No.: 18/320,420

(22) Filed: May 19, 2023

(65) Prior Publication Data

US 2023/0396553 A1 Dec. 7, 2023

(30) Foreign Application Priority Data

Jun. 1, 2022 (CN) .......................... 202210618253.X
Mar. 31, 2023 (CN) .......................... 202310348999.8

(51) Int. Cl.
*H04L 47/24* (2022.01)
*H04L 61/4511* (2022.01)

(52) U.S. Cl.
CPC .......... *H04L 47/24* (2013.01); *H04L 61/4511* (2022.05)

(58) Field of Classification Search
CPC .............................. H04L 47/24; H04L 61/4511
USPC ........................................................ 709/245
See application file for complete search history.

(56) References Cited

U.S. PATENT DOCUMENTS

| | | | | |
|---|---|---|---|---|
| 10,721,117 B2* | 7/2020 | Kaliski, Jr. | ......... | H04L 61/4511 |
| 2003/0200335 A1 | 10/2003 | Choi | | |
| 2013/0155863 A1* | 6/2013 | Ludwig | ................. | H04L 43/028 |
| | | | | 370/235 |
| 2013/0191537 A1* | 7/2013 | Ivanov | ................ | H04L 43/0876 |
| | | | | 709/224 |
| 2014/0108452 A1 | 4/2014 | Balogh | | |
| 2016/0065470 A1 | 3/2016 | Huang | | |
| 2017/0214596 A1* | 7/2017 | Eikman | ................. | H04L 43/10 |
| 2018/0139224 A1 | 5/2018 | Arnell | | |

FOREIGN PATENT DOCUMENTS

CN 112995354 A 6/2021

OTHER PUBLICATIONS

Chinese language office action dated Jan. 8, 2024, issued in application No. TW 112119347.

* cited by examiner

*Primary Examiner* — Tan Doan
(74) *Attorney, Agent, or Firm* — McClure, Qualey & Rodack, LLP (57) ABSTRACT

A method for setting priority of packet transmission is provided. The method includes receiving an uplink packet from a client device via a local area network (LAN) port. The method includes determining whether the uplink packet is a domain name system (DNS) query packet. The method includes comparing a query string in the uplink packet with a list including a plurality of strings when determining that the uplink packet is a DNS query packet. The method includes recording a first transaction ID in the uplink packet and a priority that corresponds to the query string in the list into a first recording table when the query string matches one of the plurality of strings in the list. The method includes transmitting the uplink packet to a network server according to a first priority level via a wide area network (WAN) port.

20 Claims, 8 Drawing Sheets

METHOD AND DEVICE FOR SETTING PRIORITY OF PACKET TRANSMISSION

CROSS REFERENCE TO RELATED APPLICATIONS

This application claims priority from China Patent Application No. 202210618253.X, filed on Jun. 1, 2022, and China Patent Application No 202310348999.8, filed on Mar. 31, 2023, the disclosure of which are incorporated herein in their entirety by reference.

BACKGROUND OF THE INVENTION

Field of the Invention

The present disclosure generally relates to the field of wireless communication technology. More specifically, aspects of the present disclosure relate to a method and a device for setting priority of packet transmission.

Description of the Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In recent years, with the development of mobile communication technologies, intermediate node devices that provide mobile router functions, such as mobile phone sharing networks and customer premises equipment (CPE), have become popular. These devices rarely provide configurations of Quality of Service (QoS) to networks. Usually, in order to provide this kind of service, the intermediate node devices may do different priority processing according to the Type of Service (TOS) field of the IPv4 header (or a Traffic Class field of the IPv6), but this method may encounter two problems:
1. Many upper layer applications do not set the TOS field during design. Therefore, the intermediate node device cannot use the TOS field for priority configuration of network transmission.
2. On the contrary, in order to gain advantages in network transmission, some applications set the priority of TOS field to be very high, and the value filled in the TOS field cannot fully reflect the actual demand.

In other words, the intermediate node device cannot specifically designate the network priority usage rules of certain applications according to actual needs.

Therefore, there is a need for a method and a device for setting priority of packet transmission to solve this problem.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for setting priority of packet transmission to enable the intermediate node device to flexibly configure the priority of network transmission of certain applications, so as to provide better network experience for downstream clients.

In an exemplary embodiment, a method for setting priority of packet transmission is provided. The method is used in a customer premises equipment (CPE) device. The method comprises receiving an uplink packet from a client device via a local area network (LAN) port. The method comprises determining whether the uplink packet is a domain name system (DNS) query packet. The method comprises comparing a query string in the uplink packet with a list including a plurality of strings when determining that the uplink packet is a DNS query packet. The method comprises recording a first transaction ID in the uplink packet and a priority that corresponds to the query string in the list into a first recording table when the query string matches one of the plurality of strings in the list. The method comprises transmitting the uplink packet to a network server according to a first priority level via a wide area network (WAN) port. The first transaction ID can be a first DNS transaction ID. The first priority level can be a default priority level (or a normal priority level).

In some embodiments, the method further comprises comparing an IP address (or a of the network server in the uplink packet with a second recording table including a plurality of IP addresses when determining that the uplink packet is not a DNS query packet. The method further comprises transmitting the uplink packet to the network server according to a second priority level that corresponds to the IP address in the second recording table when the IP address matches one of the plurality of IP addresses in the second recording table. The second priority level can be a priority level got from the second recording table.

In some embodiments, the method further comprises transmitting the uplink packet to the network server according to the first priority level when the IP address does not match any of the plurality of IP addresses in the second recording table.

In some embodiments, the second priority level is higher than the first priority level.

In some embodiments, the method further comprises transmitting the uplink packet to the network server according to the first priority level when the query string does not match any of the plurality of strings in the list.

In an exemplary embodiment, a method for setting priority of packet transmission is provided. The method comprises receiving a downlink packet from a network server. The method comprises determining whether the downlink packet is a domain name system (DNS) response packet. The method comprises comparing a second transaction ID in the downlink packet with a first recording table including a plurality of transaction IDs when determining that the downlink packet is a DNS response packet. The method further comprises recording an IP address of the network server in the downlink packet and a priority that corresponds to the second transaction ID in the first recording table into a second recording table when the second transaction ID matches one of the plurality of transaction IDs in the first recording table. The IP address of the network server in the downlink packet can be in DNS query results of the DNS response packet. The method further comprises transmitting the downlink packet to the client device according to a first priority level. The first priority level can be a default priority level (or a normal priority level). The second transaction ID can be a second DNS transaction ID, and can correspond to the first transaction ID.

In some embodiments, the method further comprises transmitting the downlink packet to the client device according to the first priority level when the second transaction ID does not match any of the plurality of transaction IDs in the first recording table.

In some embodiments, the method further comprises comparing an IP address of the network server in the downlink packet with the second recording table including a plurality of IP addresses when determining that the downlink packet is not a DNS response packet. The method further comprises transmitting the downlink packet to the client device according to a second priority level that corresponds to the IP address in the second recording table when the IP address of the network server matches one of the plurality of IP addresses in the second recording table.

In some embodiments, the method further comprises transmitting the downlink packet to the client device according to the first priority level when the IP address of the network server does not match any of the plurality of IP addresses in the second recording table.

In some embodiments, the second priority level is higher than the first priority level.

In an exemplary embodiment, a device for setting priority of packet transmission is provided. The device comprises one or more processors and one or more computer storage media for storing one or more computer-readable instructions, wherein the processor is configured to drive the one or more computer storage media to execute the following tasks: receiving an uplink packet from a client device via a local area network (LAN) port; determining whether the uplink packet is a domain name system (DNS) query packet; comparing a query string in the uplink packet with a list including a plurality of strings when determining that the uplink packet is a DNS query packet; recording a first transaction ID in the uplink packet and a priority that corresponds to the query string in the list into a first recording table when the query string matches one of the plurality of strings in the list; and transmitting the uplink packet to a network server according to a first priority level via a wide area network (WAN) port.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
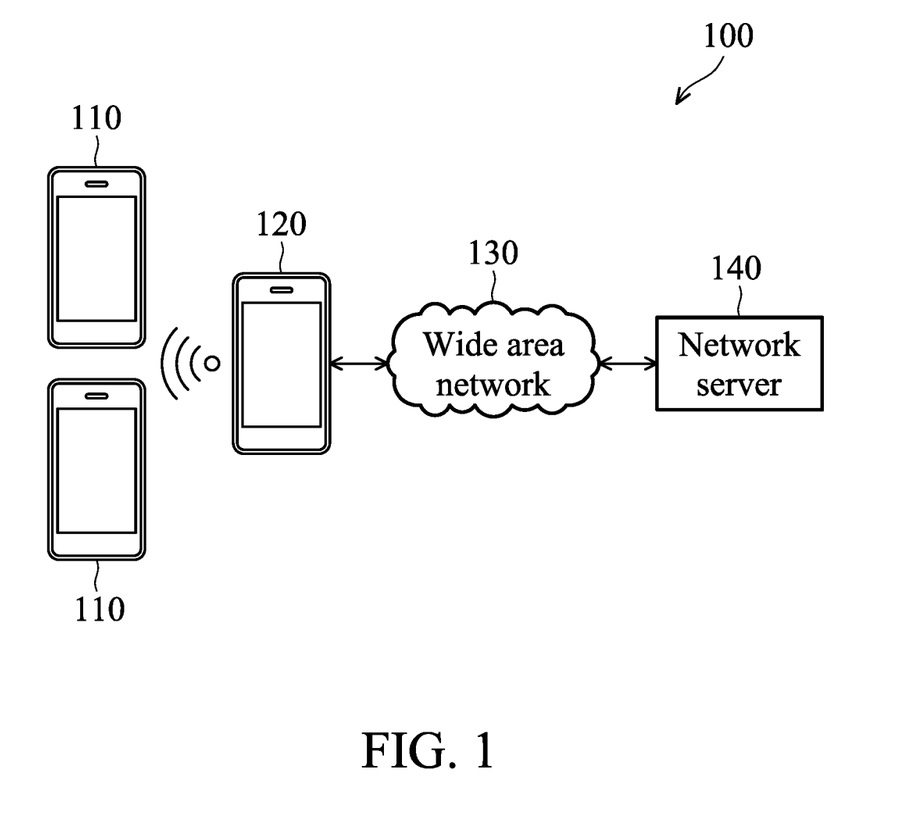
FIG. 1 is a block diagram illustrating an example network environment operable to facilitate the setting priority of packet transmission by a customer premise equipment device according to an embodiment of the disclosure.

FIG. 1 is a block diagram illustrating an example network environment 100 operable to facilitate the setting priority of packet transmission by a customer premise equipment according to an embodiment of the disclosure. In the embodiment, video, voice, and/or data services may be delivered to applications in one or more client devices 110. The client devices 110 may include mobile devices, tablets, computers, telephones (e.g., voice over Internet protocol (VoIP) telephones), gaming devices, and any other device operable to receive video, voice, and/or data services. It should be understood that various data, multimedia, and/or voice services may be delivered to the client devices 110, including but not limited to, live or broadcast television, video-on-demand (VoD) content, pay-per view content, recorded content (e.g., DVR (digital video recorder) content), audio-only content, streaming content, and others.

In some embodiments, one or more services delivered to a subscriber premises may be received and forwarded to one or more client devices 110 by a customer premise equipment (CPE) 120 such as a gateway device, an access device, a mobile device, or any other device configured to route communications from an upstream network to one or more connected or associated devices. For example, a CPE 120 may include a gateway device (e.g., residential gateway, multimedia gateway, etc.), a router, a mobile device, or any other device configured to route communications to and from one or more client devices 110.

In some embodiments, multiple services (e.g., video, voice, and/or data services) may be delivered from a network server 140 to a CPE 120 through a wide-area network (WAN) 130. In addition, the network server 140 may include one or more network devices that receive domain name system (DNS) query/request packets from the client devices 110 via the CPE 120 and transmit DNS response packets to the client devices 110 in response to the DNS query/request packets via the CPE 120.

In some embodiments, multiple services may be delivered from the CPE 120 to one or more client devices 110 through a local network. The local network may include a local area network (LAN), wireless local area network (WLAN), personal area network (PAN), mobile hotspot network, and others. The local network may be provided by the CPE 120. It will be appreciated by those skilled in the relevant art that delivery of the multiple services over the local network may be accomplished using a variety of standards and formats.

An application (e.g., web browser, game or other application that is configured to access the Internet or other upstream network) running at a client device 110 may be configured to transmit packets to and receive packets from the network server 140 via the CPE 120.

Figure 2:
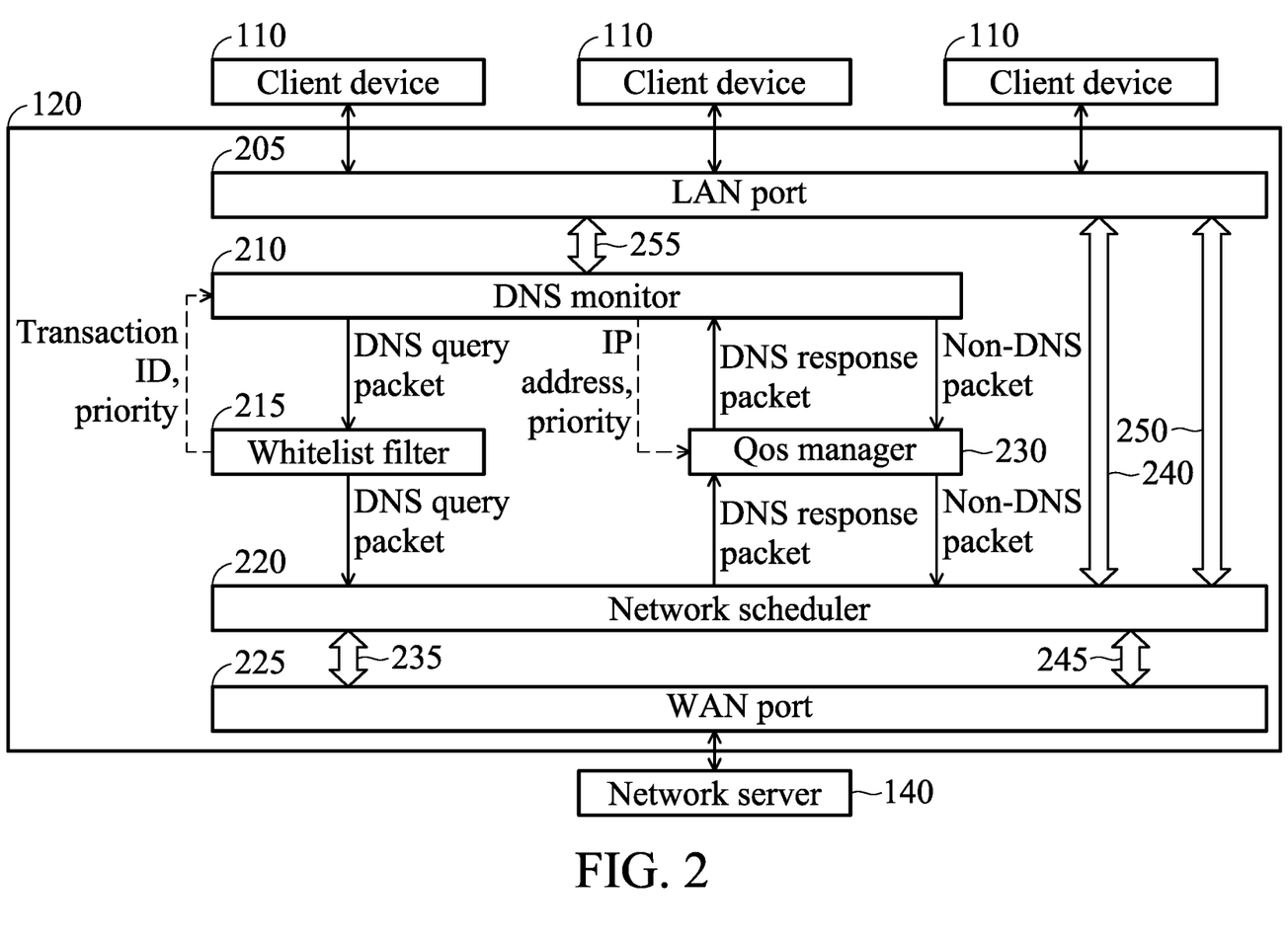
FIG. 2 is a block diagram illustrating an example CPE device operable to setting priority of packet transmission according to an embodiment of the disclosure.

FIG. 2 is a block diagram illustrating an example CPE 120 operable to setting priority of packet transmission according to an embodiment of the disclosure. The CPE 120 may comprise a LAN port 205, a DNS monitor 210, a whitelist filter 215, a network scheduler 220, a WAN port 225 and a Qos manager 230.

The CPE 120 may receive one or more services and/or communications from one or more other routing or access devices or upstream network elements (e.g., the network server 140 of FIG. 1, etc.) through the WAN port 225, and the CPE 120 may forward one or more services and/or communications to one or more client devices 110 of FIG. 1 through the LAN port 205.

When the CPE 120 is initialized, a white list may be preloaded in the whitelist filter 215, wherein the white list records the DNS query strings that the client devices are concerned about, and the priorities that correspond to the DNS query strings. The administrator or the user of the CPE 120 may also update or modify the white list as required through the remote network. The white list is shown in TABLE 1.

TABLE 1

| Number | String | priority | Service | Note |
| --- | --- | --- | --- | --- |
| 1 | "tmgp" | 3 | Game | Honor of Kings |
| 2 | "pubgmhd" | 3 | Game | Game for Peace |
| 3 | "iqiyi" | 0 | Live Steam | Live Stream |
| 4 | "qqlive" | 2 | Live Broadcast | Live Broadcast |

The network scheduler 220 manages several priority levels, for example, normal priority levels 235, 240 and high priority levels 245 and 250. It should be noted that, in some embodiments of the disclosure, the number of the priority levels may be extended to more than two, and the disclosure should not be limited to what is shown in FIG. 2. When an uplink packet is transmitted from a client device to the CPE 120, the uplink packet may first reach the DNS monitor 210. The DNS monitor 210 determines whether the uplink packet is a domain name system (DNS) query packet. When the uplink packet is a valid DNS query packet, the DNS monitor 210 may transmit the uplink packet to the whitelist filter 215, wherein the uplink packet that is a valid DNS query packet may comprise a query string, a transaction identity (ID), a receive time and a lifetime. When the uplink packet is not a DNS query packet, the DNS monitor 210 may transmit the uplink packet to the network scheduler 220 via the Qos manager. The network scheduler 220 transmits the uplink packet to the network server 240 according to the normal priority level 235 via the WAN port 225.

When the whitelist filter 215 receives the uplink packet, the whitelist filter 215 first parses the uplink packet to obtain the query string, and compares the query string with the white list, which includes a plurality of strings. When the query string matches one of the plurality of strings in the white list, the whitelist filter 215 may notify the DNS monitor 210 of a transaction ID in the uplink packet and a priority that corresponds to the query string in the white list. Next, the whitelist filter 215 transmits the uplink packet to the network scheduler 220. The network scheduler 220 transmits the uplink packet to the network server 140 according to the normal priority level 235 via the WAN port 225.

The DNS monitor 210 records the transaction ID and the priority that corresponds to the query string into a first recording table. The first recording table is shown in TABLE 2.

TABLE 2

| Number | Transaction ID | priority | Receive Time | Lifetime |
| --- | --- | --- | --- | --- |
| 1 | 0x1d2c | 3 | | |
| 2 | 0xd02d | 3 | | |
| 3 | 0x1c22 | 0 | | |

After the uplink packet that is a DNS query packet is transmitted to the network server 140, the Qos manager 230 receives a downlink packet from the network server 140 via the WAN port 225 and the network scheduler 220. The Qos manager 230 determines whether the downlink packet is a DNS response packet. When the downlink packet is a valid DNS response packet, the Qos manager 230 may transmit the downlink packet to the DNS monitor 210, wherein the downlink packet that is a valid DNS response packet may at least comprise a transaction ID and an IP address of the network server 140 that transmits the downlink packet. When the downlink packet is not a DNS response packet, the Qos manager 230 may transmit the downlink packet to the network scheduler 220. The network scheduler 220 transmits the downlink packet to one of the client devices 110 according to the normal priority level 240 via the LAN port 205.

When the DNS monitor 210 receives the downlink packet, the DNS monitor 210 may compare the transaction ID in the downlink packet with the first recording table including a plurality of transaction IDs, and determine whether the transaction ID in the downlink packet matches any of the plurality of transaction IDs in the first recording table. When the transaction ID matches one of the plurality of transaction IDs in the first recording table, the DNS monitor 210 may notify the Qos manager 230 of the IP address of the network server 140 in the downlink packet and a priority that corresponds to the transaction ID in the first recording table, and transmits the downlink packet according to the normal priority level via the LAN port 205.

The Qos manager 230 records the IP address of the network server 140 and the priority that corresponds to the transaction ID into a second recording table. The second recording table is shown in TABLE 3.

TABLE 3

| Number | IP address | priority | Receive Time | Lifetime |
|---|---|---|---|---|
| 1 | 200.1.22.3 | 3 | | |
| 2 | 203.11.10.2 | 3 | | |
| 3 | 34.23.65.1 | 0 | | |

In the process of forwarding packets, for the uplink packet transmitted to the WAN port 225, the Qos manager 230 first checks whether the IP address of the network server in the uplink packet matches any of the IP addresses in the second recording table. When the IP address of the network server in the uplink packet matches one of the IP addresses in the second recording table, the network scheduler 220 may transmit the uplink packet to the WAN port 225 according to the priority level that corresponds to the IP address. For the downlink packet transmitted to the LAN port 205, the Qos manager 230 first checks whether the IP address of the network server in the downlink packet matches any of the IP addresses in the second recording table. When the IP address of the network server in the downlink packet matches one of the IP addresses in the second recording table, the network scheduler 220 may transmit the downlink packet to the LAN port 205 according to the priority level that corresponds to the IP address.

In some embodiments, in addition to the DNS monitor 210 that may add new entries into the second recording table, the Qos manager 230 may also actively add new entries and maintain the second recording table according to historical learning data.

Figure 3A:
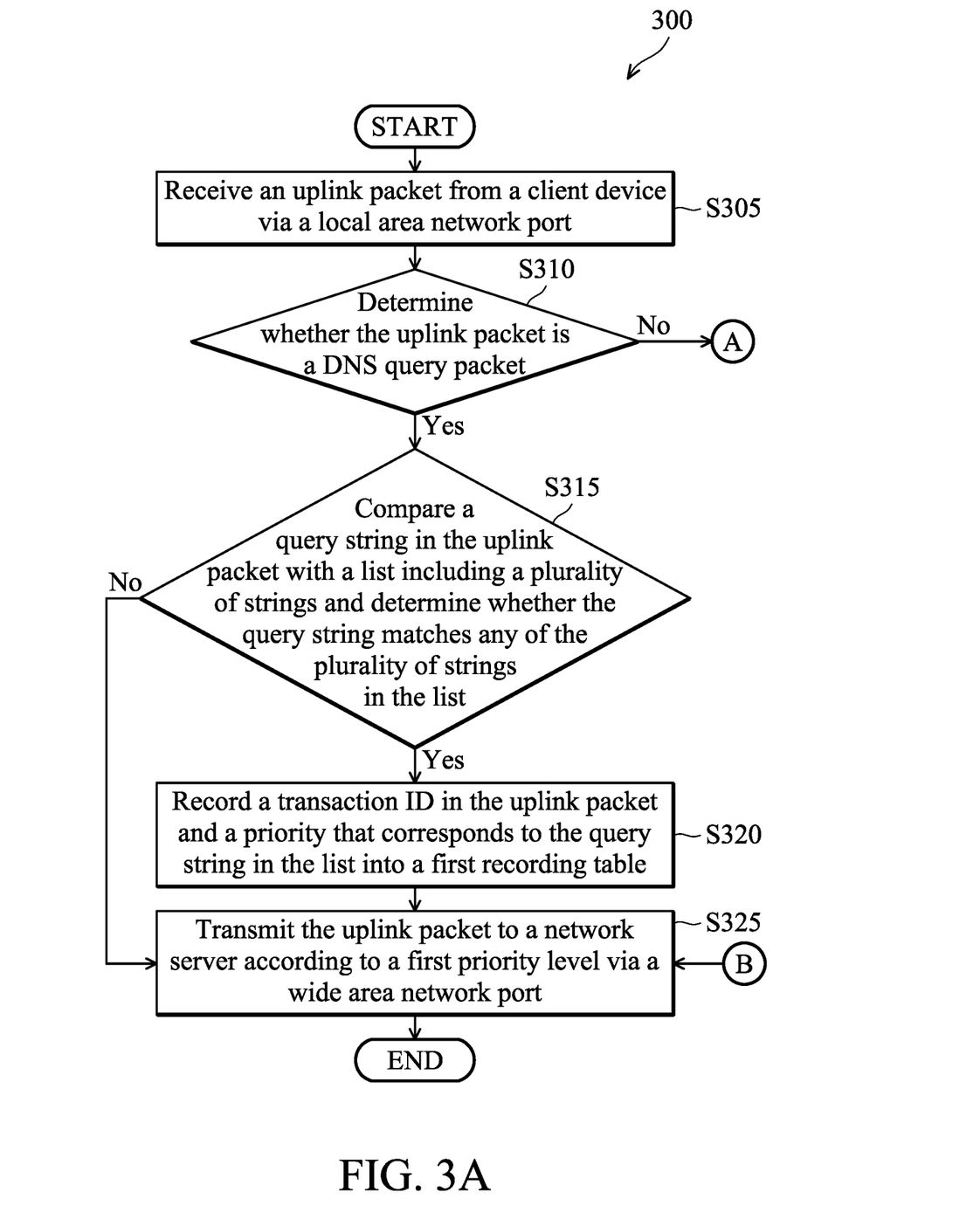
FIGS. 3A-3B are a flow chart illustrating the method for setting priority of packet transmission in the uplink direction according to an embodiment of the disclosure.
Figure 3B:
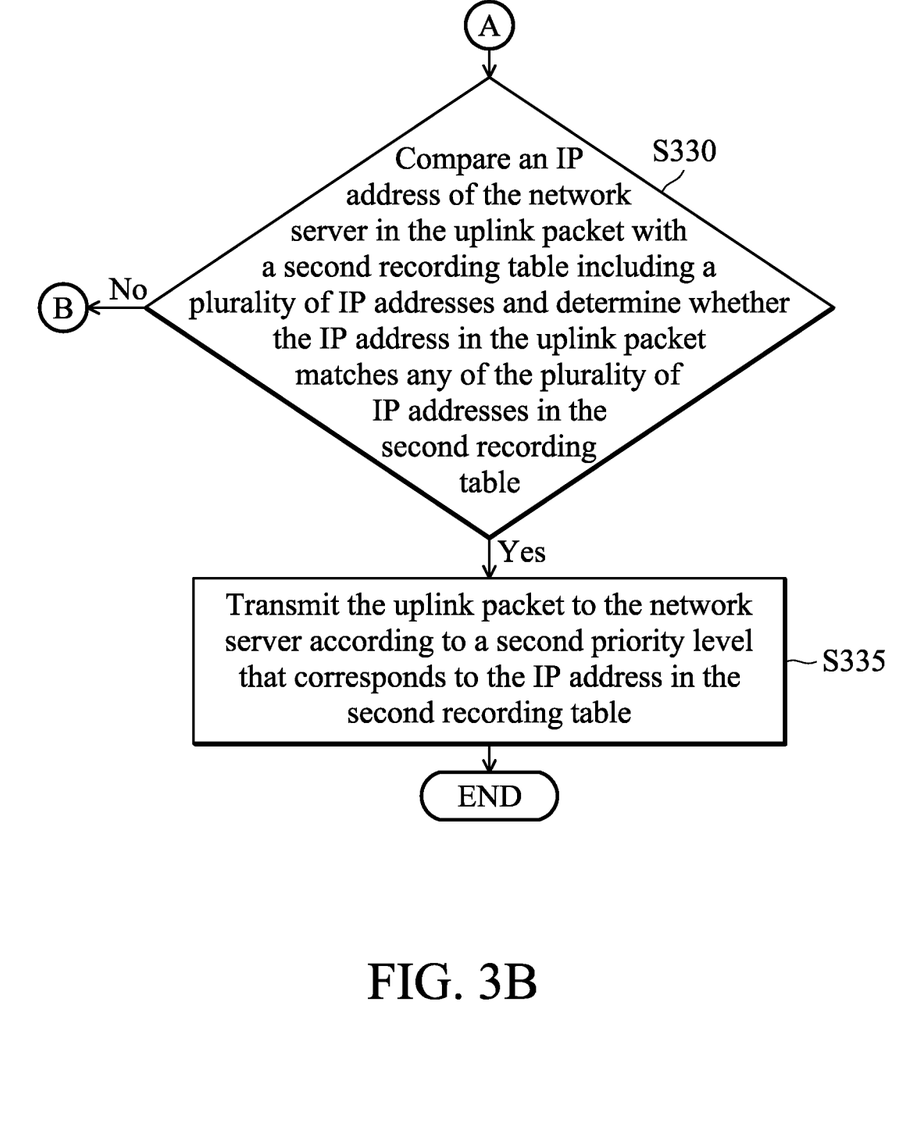

FIGS. 3A-3B are a flow chart 300 illustrating the method for setting priority of packet transmission in the uplink direction according to an embodiment of the disclosure. In this embodiment, the method is applied to a CPE in FIG. 2.

In step S305, the DNS monitor of the CPE receives an uplink packet from a client device via a local area network (LAN) port. Then, in step S310, the DNS monitor determines whether the uplink packet is a domain name system (DNS) query packet.

When the DNS monitor determines that the uplink packet is a DNS query packet ("Yes" in step S310), in step S315, the DNS monitor forwards the uplink packet to the whitelist filter of the CPE, and the whitelist filter compares a query string in the uplink packet with a list including a plurality of strings and determines whether the query string in the uplink packet matches any of the plurality of strings in the list.

When the query string matches one of the plurality of strings in the list ("Yes" in step S315), in step S320, the whitelist filter may notify the DNS monitor of a transaction ID in the uplink packet and a priority that corresponds to the query string in the list and transmit the uplink packet to the network scheduler of the CPE, and the DNS monitor records the transaction ID in the uplink packet and the priority that corresponds to the query string in the list into a first recording table, wherein the transaction ID can be a DNS transaction ID. Specifically, the query string is the string that the client devices are concerned about.

In step S325, the network scheduler of the CPE transmits the uplink packet to a network server according to a first priority level via a wide area network (WAN) port, wherein the first priority level can be a default priority level (or a normal priority level).

Returning to step S315, when the query string does not match any of the plurality of strings in the list ("No" in step S315), in step S325, the whitelist filter transmits the uplink packet to the network scheduler of the CPE, and the network scheduler transmits the uplink packet to the network server according to the first priority level via the WAN port.

Returning to step S310, when the DNS monitor determines that the uplink packet is not a DNS query packet ("No" in step S310), in step S330, the DNS monitor forwards the uplink packet to the Qos manager, and the Qos manager compares an IP address (or a destination address) of the network server in the uplink packet with a second recording table including a plurality of IP addresses and determines whether the IP address in the uplink packet matches any of the plurality of IP addresses in the second recording table.

When the IP address in the uplink packet matches one of the plurality of IP addresses in the second recording table ("Yes" in step S330), in step S335, the Qos manager transmits the uplink packet to the network scheduler, and the network scheduler transmits the uplink packet to the network server according to a second priority level that corresponds to the IP address in the second recording table, wherein the second priority level is higher than the first priority level and can be a priority level got from the second recording table.

Returning to step S330, when the IP address in the uplink packet does not match any of the plurality of IP addresses in the second recording table ("No" in step S330), in step S325, the Qos manager transmits the uplink packet to the network scheduler, and the network scheduler transmits the uplink packet to the network server according to the first priority level via the WAN port.

Figure 4A:
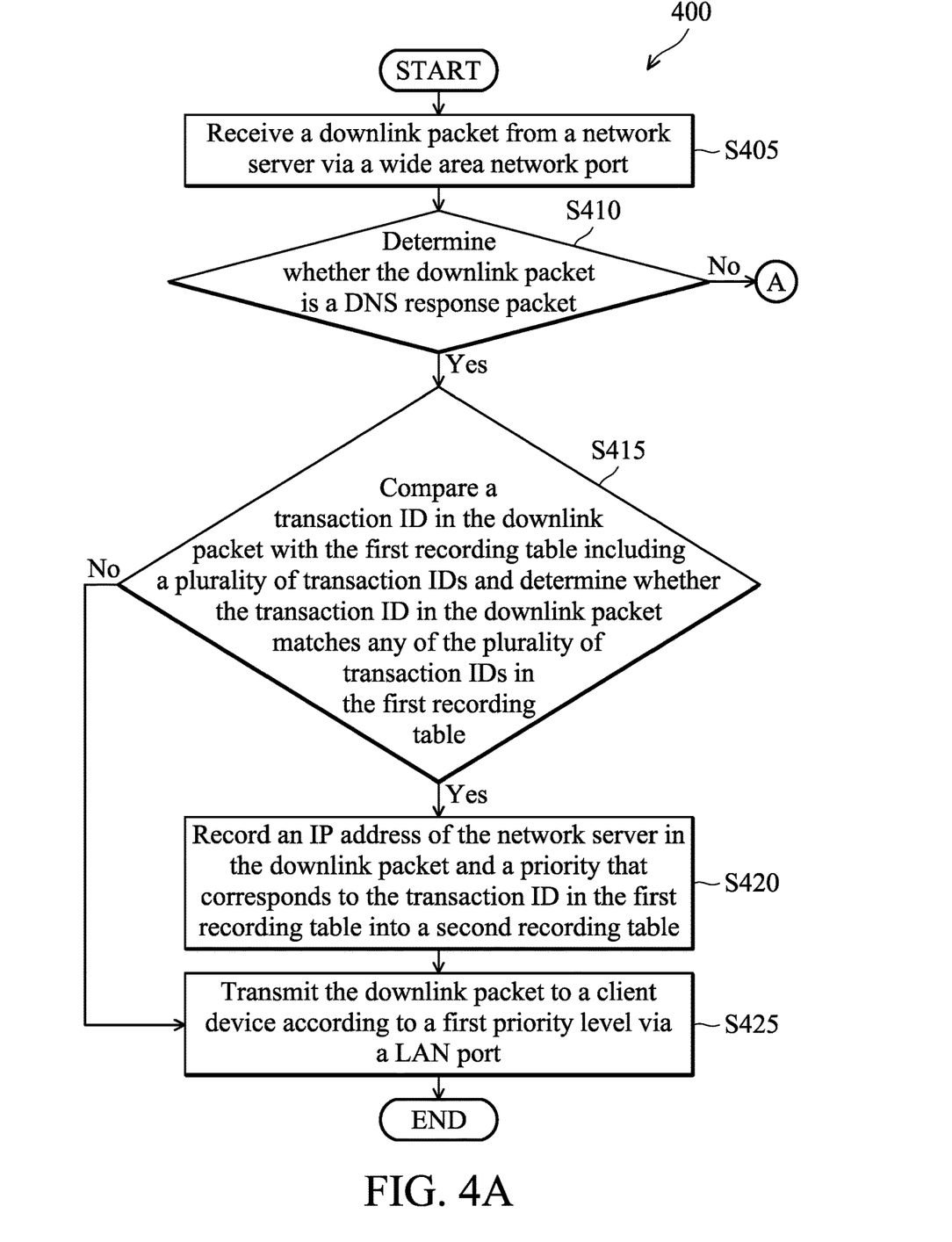
FIGS. 4A-4B are a flow chart illustrating the method for setting priority of packet transmission in the downlink direction according to an embodiment of the disclosure.
Figure 4B:
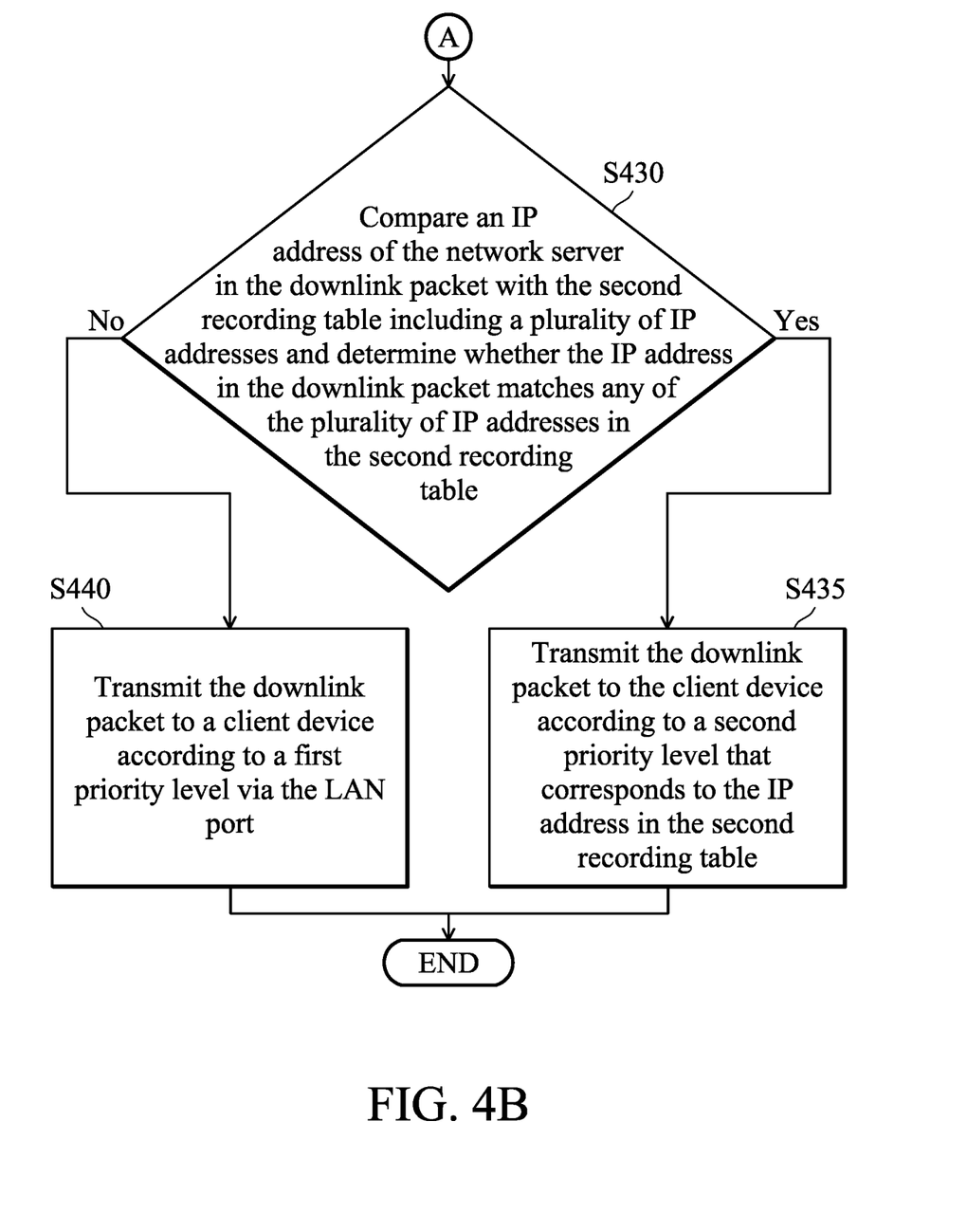

FIGS. 4A-4B are a flow chart 400 illustrating the method for setting priority of packet transmission in the downlink direction according to an embodiment of the disclosure. In this embodiment, the method is applied to a CPE in FIG. 2.

In step S405, the Qos manager of the CPE receives a downlink packet from a network server via a wide area network (WAN) port and the network scheduler of the CPE. Then, in step S410, the Qos manager determines whether the downlink packet is a domain name system (DNS) response packet.

When the Qos manager determines that the downlink packet is a DNS response packet ("Yes" in step S410), in step S415, the Qos manager transmits the downlink packet to the DNS monitor of the CPE, and the DNS monitor compares a transaction ID in the downlink packet with the first recording table including a plurality of transaction IDs and determines whether the transaction ID in the downlink packet matches any of the plurality of transaction IDs in the first recording table.

When the transaction ID matches one of the plurality of transaction IDs in the first recording table ("Yes" in step S415), in step S420, the DNS monitor records an IP address of the network server in the downlink packet and a priority that corresponds to the transaction ID in the first recording table into a second recording table, wherein the IP address of the network server in the downlink packet can be in DNS query results of the DNS response packet. Specifically, the IP address of the network server has a special priority requirement. In some embodiments, the transaction ID can be a DNS transaction ID, and can correspond to the transaction ID in step S320.

In step S425, the DNS monitor transmits the downlink packet to a client device according to a first priority level via a LAN port, wherein the first priority level can be a default priority level (or a normal priority level).

Returning to step S415, when the transaction ID does not match any of the plurality of transaction IDs in the first recording table ("No" in step S415), in step S425, the DNS monitor transmits the downlink packet to the client device according to the first priority level via the LAN port.

Returning to step S410, when the Qos manager determines that the downlink packet is not a DNS response packet ("No" in step S410), in step S430, the Qos manager compares an IP address of the network server in the downlink packet with the second recording table including a plurality of IP addresses and determines whether the IP address in the downlink packet matches any of the plurality of IP addresses in the second recording table.

When the IP address in the downlink packet matches one of the plurality of IP addresses in the second recording table ("Yes" in step S430), in step S435, the Qos manager transmits the downlink packet to the network scheduler of the CPE, and the network scheduler transmits the downlink packet to the client device according to a second priority level that corresponds to the IP address in the second recording table, wherein the second priority level is higher than the first priority level.

Returning to step S430, when the IP address in the downlink packet does not match any of the plurality of IP addresses in the second recording table ("No" in step S430), in step S435, the network scheduler transmits the downlink packet to the client device according to the first priority level via the LAN port.

Figure 5:
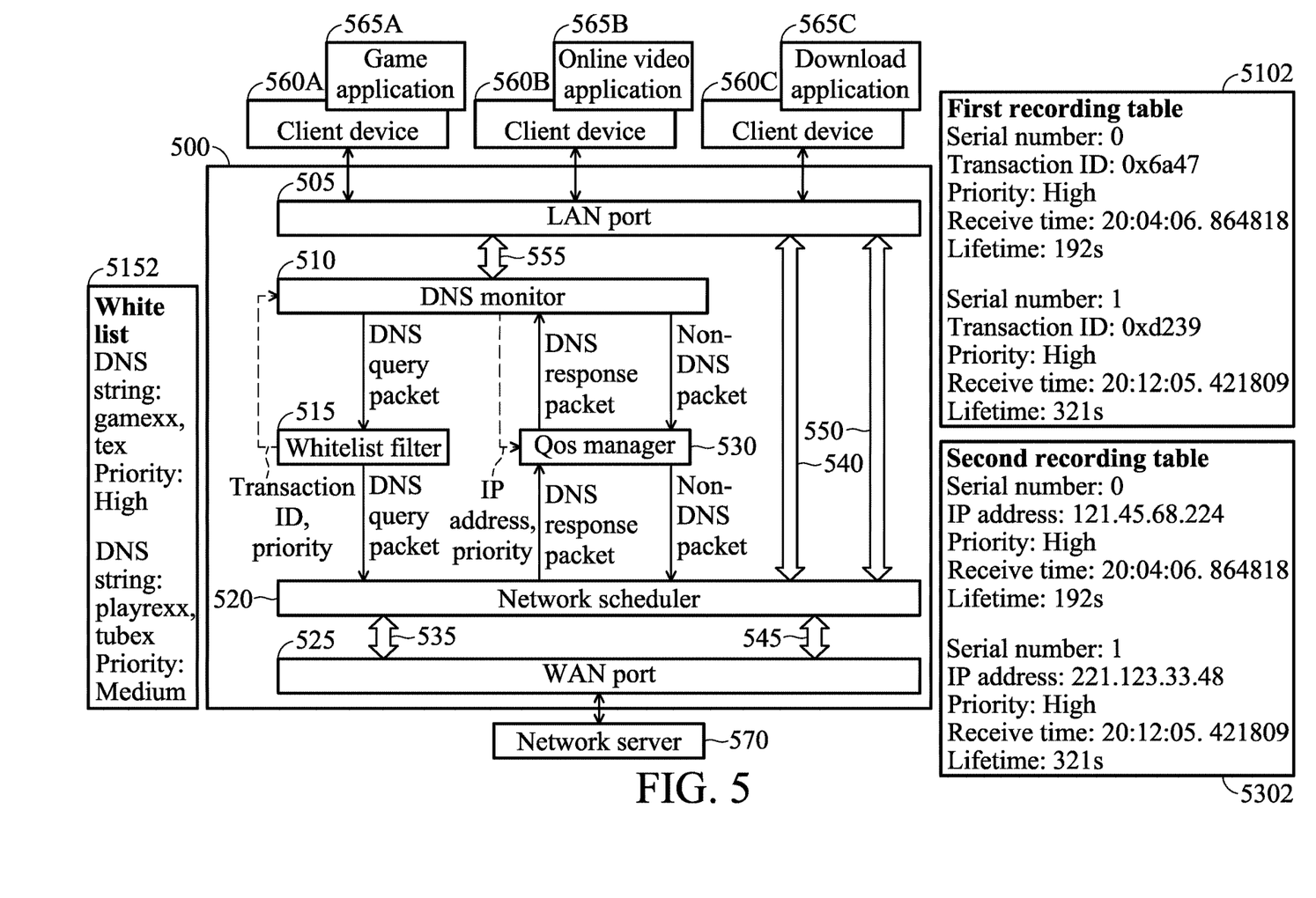
FIG. 5 is a specific case illustrating a method for setting priority of packet transmission according to an embodiment of the present disclosure.

FIG. 5 is a specific case illustrating a method for setting priority of packet transmission according to an embodiment of the present disclosure. The typical application scenario of this case is that when a mobile device such as a mobile phone shares the network or a CPE device works, different network priority processing is performed for specific types of applications to improve user experiences. In FIG. 5, there are three client devices 560A, 560B and 560C connected to the CPE 500, and the users of the client devices 560A, 560B and 560C uses different applications 565A, 565B and 565C, so the requirements for the packet transmission are different. The client device 560B that uses the online video application 565B and the client device 560C that uses the download application 565C require a large amount of bandwidth, but not sensitive to delay requirements. However, the game application 565A used by the client device 560A is sensitive to the network delay, but has very low bandwidth requirements.

In order to better serve the above scenario, the built-in whitelist 5152 of the CPE 500 records the commonly used strings of game applications. It is assumed that the client device 560B and the client device 560C have performed their respective applications. When the client device 560A performs the game application 565A, the game application 565A may first output a DNS query packet to query the IP address of a game, wherein a transaction ID of the DNS query packet is 0xd239. The DNS query packet reaches the DNS monitor 510 via the LAN port 505, and the DNS monitor 510 determines that the DNS query packet is a valid DNS query packet, and forwards the DNS query packet to the whitelist filter 515 for processing. The whitelist filter 515 compares the query string in the DNS query packet with the white list 5152. When the whitelist filter 515 determines that the query string in the DNS query packet matches one of the plurality of strings in the white list 5152, the whitelist filter 515 notifies the DNS monitor 510 to record the transaction ID, the priority that corresponds to the query string in the white list 5152, the receive time and the lifetime into the first recording table 5102. For example, the information corresponding to serial number 1 is the information newly recorded by the DNS monitor. Then, the whitelist filter 515 forwards the DNS query packet to the network scheduler 520, and the network scheduler 520 transmits the DNS query packet to the game server according to a normal priority level.

The DNS response packet transmitted by the network server 570 comprises an IP address of the game server. The Qos manager 530 may transmit the DNS response packet to the DNS monitor 510 for processing when receiving the DNS response packet. The DNS monitor 510 finds that the transaction ID of the DNS response packet is 0xd239, indicating that the IP address carried by the DNS response packet is the IP address of the game server corresponding to the game application 565A. Then, the DNS monitor 510 may notify the Qos manager 530 to record the IP address of the game server and the information corresponding to the serial number 1 into the second recording table 5302. The DNS monitor 510 forwards the DNS response packet to the LAN port 505 according to the normal priority level.

Thereafter, when a packet transmitted by the download application 565C or the online video application 565B is transmitted from the LAN port 505 to the network server 570, the packet is transmitted to the WAN port 525 according to a normal priority level 535 since the IP address in the packet is not recorded in the second recording table 5302. When a packet is transmitted from the WAN port 525 to the download application 565C or the online video application 565B, the packet is transmitted to the LAN port 505 according to the normal priority level 540 since the IP address in the packet is not recorded in the second recording table 5302.

When a packet transmitted by the game application 565A is transmitted from the LAN port 505 to the network server 570, the packet is transmitted to the WAN port 525 according to the high priority level 545 since the IP address in the packet is recorded in the second recording table 5302. When a packet transmitted from the WAN port 525 to the game application 565A, the packet is transmitted to the LAN port 505 according to the high priority level 550 since the IP address in the packet is recorded in the second recording table 5302. In this way, the network delay of the game application 565A is effectively reduced, and the user experience of the game application 565A is improved.

As mentioned above, the method and device for setting priority of packet transmission in the disclosure may achieve the purpose of flexibly setting the network priority of an application on the CPE, and provide better network experiences for downstream clients.

It should be noted that the DNS monitor 210, the whitelist filter 215, the network scheduler 220 and the Qos manager 230 in FIG. 2 and the DNS monitor 510, the whitelist filter 515, the network scheduler 520 and the Qos manager 530 in FIG. 5 may be implemented in hardware, software, firmware, or any combination thereof. For example, the DNS monitor 210, the whitelist filter 215, the network scheduler 220 and the Qos manager 230 may be implemented as computer program code configured to be executed in one or more processors. Alternatively, the DNS monitor 210, the whitelist filter 215, the network scheduler 220 and the Qos manager 230 may be implemented as hardware logic/electrical circuitry. For another example, the DNS monitor 510, the whitelist filter 515, the network scheduler 520 and the Qos manager 530 may be implemented as computer program code configured to be executed in one or more processors. Alternatively, the DNS monitor 510, the whitelist filter 515, the network scheduler 520 and the Qos manager 530 may be implemented as hardware logic/electrical circuitry.

Figure 6:
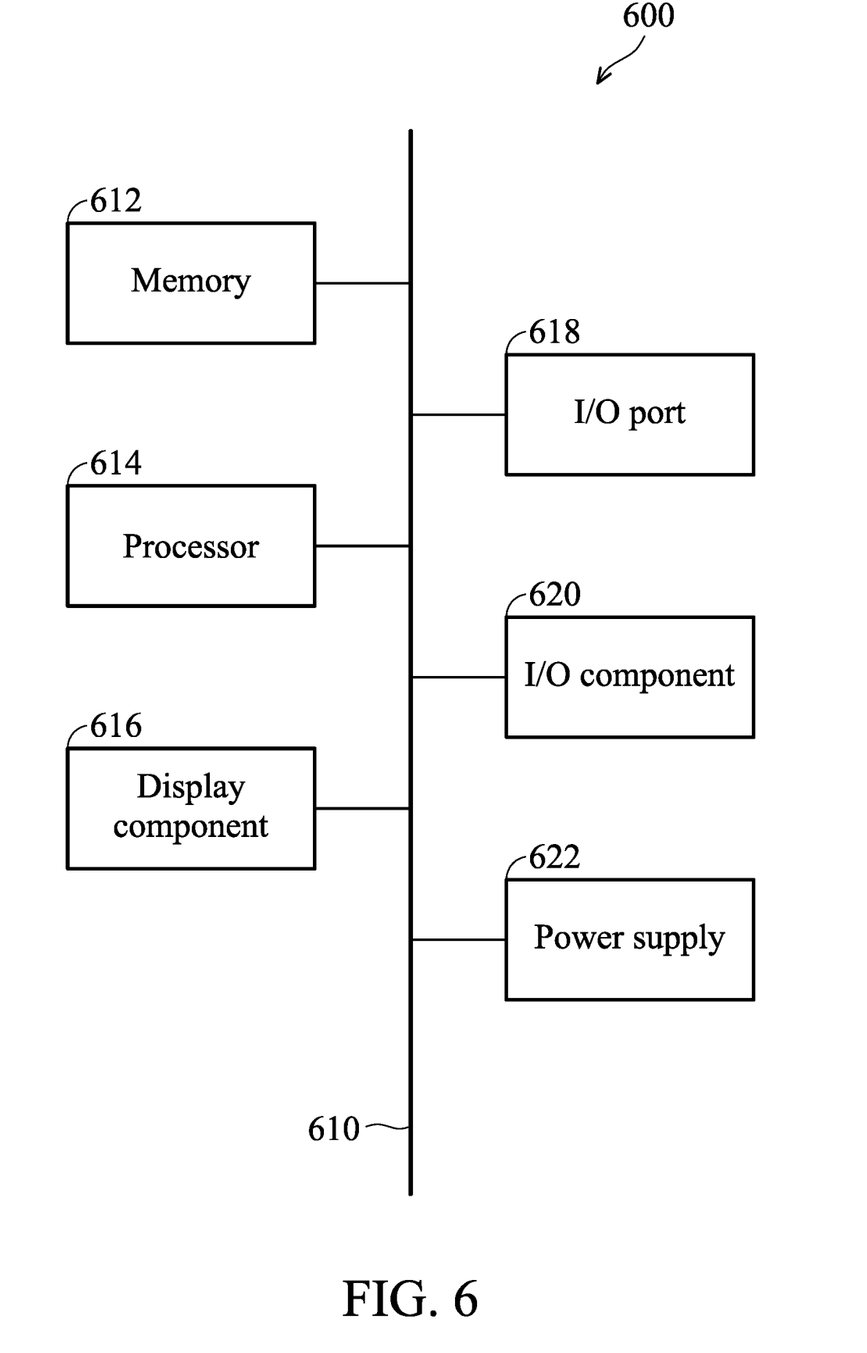
FIG. 6 illustrates an exemplary operating environment for implementing embodiments of the present disclosure.

The embodiments described herein, including systems, methods/processes, and/or apparatuses, may be implemented using well known servers/computers, such as a computing device 600 shown in FIG. 6. For example, the CPE 120 and the CPE 500 can be implemented using one or more computing device 600. The computing device 600 is described as follows, for purposes of illustration.

Referring to FIG. 6, an exemplary operating environment for implementing embodiments of the present disclosure is shown and generally known as a computing device 600. The computing device 600 is merely an example of a suitable computing environment and is not intended to limit the scope of use or functionality of the disclosure. Neither should the computing device 600 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 6, the computing device 600 may include a bus 610 that is directly or indirectly coupled to the following devices: one or more memories 612, one or more processors 614, one or more display components 616, one or more input/output (I/O) ports 618, one or more input/output components 620, and an illustrative power supply 622. The bus 610 may represent one or more kinds of busses (such as an address bus, data bus, or any combination thereof). Although the various blocks of FIG. 6 are shown with lines for the sake of clarity, and in reality, the boundaries of the various components are not specific. For example, the display component such as a display device may be considered an I/O component and the processor may include a memory.

The computing device 600 typically includes a variety of computer-readable media. The computer-readable media can be any available media that can be accessed by computing device 600 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 600. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 612 may include computer-storage media in the form of volatile and/or nonvolatile memory. The memory may be removable, non-removable, or a combination thereof. Exemplary hardware devices include solid-state memory, hard drives, optical-disc drives, etc. The computing device 600 includes one or more processors that read data from various entities such as the memory 612 or the I/O components 620. The display component(s) 616 present data indications to a user or to another device. Exemplary presentation components include a display device, speaker, printing component, vibrating component, etc.

The I/O ports 618 allow the computing device 600 to be logically coupled to other devices including the I/O components 620, some of which may be embedded. Illustrative components include a microphone, joystick, game pad, satellite dish, scanner, printer, wireless device, etc. The I/O components 620 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 600, or any combination thereof. The computing device 600 may be equipped with depth cameras, such as stereoscopic camera systems, infrared camera systems, RGB camera systems, or any combination thereof, to realize gesture detection and recognition. Furthermore, the computing device 600 may be equipped with accelerometers or gyroscopes that enable detection of motion. The output of the accelerometers or gyroscopes may be provided to the display of the computing device 600 to carry out immersive augmented reality or virtual reality.

Furthermore, the processor 614 in the computing device 600 can execute the program code in the memory 612 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for setting priority of packet transmission, comprising:
    receiving an uplink packet from a client device via a local area network (LAN) port;
    determining whether the uplink packet is a domain name system (DNS) query packet;
    comparing by a filter a query string in the uplink packet with a list including a plurality of strings based on determining that the uplink packet is a DNS query packet, wherein the list includes priority levels for the plurality of strings;
    recording a first transaction ID in the uplink packet and a priority of one of the plurality of strings in the list into a first recording table when the query string matches the one of the plurality of strings in the list;
    transmitting the uplink packet to a network server according to a first priority level via a wide area network (WAN) port; and
    comparing an IP address of the network server in the uplink packet with a second recording table including a plurality of IP addresses when determining that the uplink packet is not a DNS query packet.

2. The method as claimed in claim 1, comprising:
    transmitting the uplink packet to the network server according to a second priority level that corresponds to the IP address in the second recording table when the IP address matches one of the plurality of IP addresses in the second recording table.

3. The method as claimed in claim 2, comprising:
    transmitting the uplink packet to the network server according to the first priority level when the IP address does not match any of the plurality of IP addresses in the second recording table.

4. The method as claimed in claim 2, wherein the second priority level is higher than the first priority level.

5. The method as claimed in claim 1, comprising:
    transmitting the uplink packet to the network server according to the first priority level when the query string does not match any of the plurality of strings in the list.

6. A method for setting priority of packet transmission, comprising:
    receiving a downlink packet from a network server;
    determining whether the downlink packet is a domain name system (DNS) response packet;
    comparing a second transaction ID in the downlink packet with a first recording table including a plurality of transaction IDs based on determining that the downlink packet is a DNS response packet, wherein the first recording table includes priority levels for the plurality of transaction IDs;
    recording an IP address of the network server in the downlink packet and a priority of one of the plurality of transaction IDs into a second recording table when the second transaction ID matches the one of the plurality of transaction IDs in the first recording table;
    transmitting the downlink packet to the client device according to a first priority level; and
    comparing an IP address of the network server in the downlink packet with the second recording table including a plurality of IP addresses when determining that the downlink packet is not a DNS response packet.

7. The method as claimed in claim 6, comprising:
    transmitting the downlink packet to the client device according to the first priority level when the second transaction ID does not match any of the plurality of transaction IDs in the first recording table.

8. The method as claimed in claim 6, comprising:
    transmitting the downlink packet to the client device according to a second priority level that corresponds to the IP address in the second recording table when the IP address of the network server matches one of the plurality of IP addresses in the second recording table.

9. The method as claimed in claim 8, comprising:
    transmitting the downlink packet to the client device according to the first priority level when the IP address of the network server does not match any of the plurality of IP addresses in the second recording table.

10. The method as claimed in claim 8, wherein the second priority level is higher than the first priority level.

11. A device for setting priority of packet transmission, comprising:
    one or more processors; and
    one or more computer storage media for storing one or more computer-readable instructions, wherein the processor is configured to drive the one or more computer storage media to execute the following tasks:
    receiving an uplink packet from a client device via a local area network (LAN) port;
    determining whether the uplink packet is a domain name system (DNS) query packet;
    comparing by a filter of the device a query string in the uplink packet with a list including a plurality of strings based on determining that the uplink packet is a DNS query packet, wherein the list includes priority levels for the plurality of strings;
    recording a first transaction ID in the uplink packet and a priority of one of the plurality of strings in the list into a first recording table when the query string matches the one of the plurality of strings in the list;
    transmitting the uplink packet to a network server according to a first priority level via a wide area network (WAN) port; and
    comparing an IP address of the network server in the uplink packet with a second recording table including a plurality of IP addresses when determining that the uplink packet is not a DNS query packet.

12. The device as claimed in claim 11, wherein the processor further executes the following tasks:
    transmitting the uplink packet to the network server according to a second priority level that corresponds to the IP address in the second recording table when the IP address matches one of the plurality of IP addresses in the second recording table.

13. The device as claimed in claim 12, wherein the processor further executes the following tasks:
    transmitting the uplink packet to the network server according to the first priority level when the IP address does not match any of the plurality of IP addresses in the second recording table.

14. The device as claimed in claim 12, wherein the second priority level is higher than the first priority level.

15. The device as claimed in claim 11, wherein the processor further executes the following tasks:
    transmitting the uplink packet to the network server according to the first priority level when the query string does not match any of the plurality of strings in the list.

16. The device as claimed in claim 11, wherein the processor further executes the following tasks:
    receiving a downlink packet from the network server;
    determining whether the downlink packet is a domain name system (DNS) response packet;
    comparing a second transaction ID in the downlink packet with the first recording table including a plurality of transaction IDs based on determining that the downlink packet is a DNS response packet, wherein the first recording table includes priority levels for the plurality of transaction IDs;
    recording an IP address of the network server in the downlink packet and a priority of one of the plurality of transaction IDs into a second recording table when the second transaction ID matches the one of the plurality of transaction IDs in the first recording table; and
    transmitting the downlink packet to the client device according to the first priority level.

17. The device as claimed in claim 16, wherein the processor further executes the following tasks:
    transmitting the downlink packet to the client device according to the first priority level when the second transaction ID does not match any of the plurality of transaction IDs in the first recording table.

18. The device as claimed in claim 16, wherein the processor further executes the following tasks:
    comparing an IP address of the network server in the downlink packet with the second recording table including a plurality of IP addresses when determining that the downlink packet is not a DNS response packet; and
    transmitting the downlink packet to the client device according to a second priority level that corresponds to the IP address in the second recording table when the IP address of the network server matches one of the plurality of IP addresses in the second recording table.

19. The device as claimed in claim 18, wherein the processor further executes the following tasks:
    transmitting the downlink packet to the client device according to the first priority level when the IP address of the network server does not match any of the plurality of IP addresses in the second recording table.

20. The device as claimed in claim 18, wherein the second priority level is higher than the first priority level.

\* \* \* \* \*